Sheet 1-2 Sheets.

J. G. Allen,
Spirit Meter,

Nº 76,690. Patented Apr. 14, 1868.

Witnesses:

Inventor:

J. G. Allen,
Spirit Meter,
Nº 76,690.  Patented Apr. 14, 1868.

Witnesses:
Inventor:

United States Patent Office.

J. G. ALLEN, OF PHILADELPHIA, PENNSYLVANIA.

*Letters Patent No. 76,690, dated April 14, 1868.*

IMPROVEMENT IN SPIRIT-METERS.

*The Schedule referred to in these Letters Patent and making part of the same.*

TO ALL WHOM IT MAY CONCERN:

Be it known that I, J. G. ALLEN, of Philadelphia, in the county of Philadelphia, and State of Pennsylvania, have invented certain new and useful Improvements in Spirit-Meters; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists in certain improvements in spirit-meters, whereby their efficiency and security are very greatly increased, as hereinafter explained.

Figures 3, 4, 5, and 6 represent details.

Figure 1:
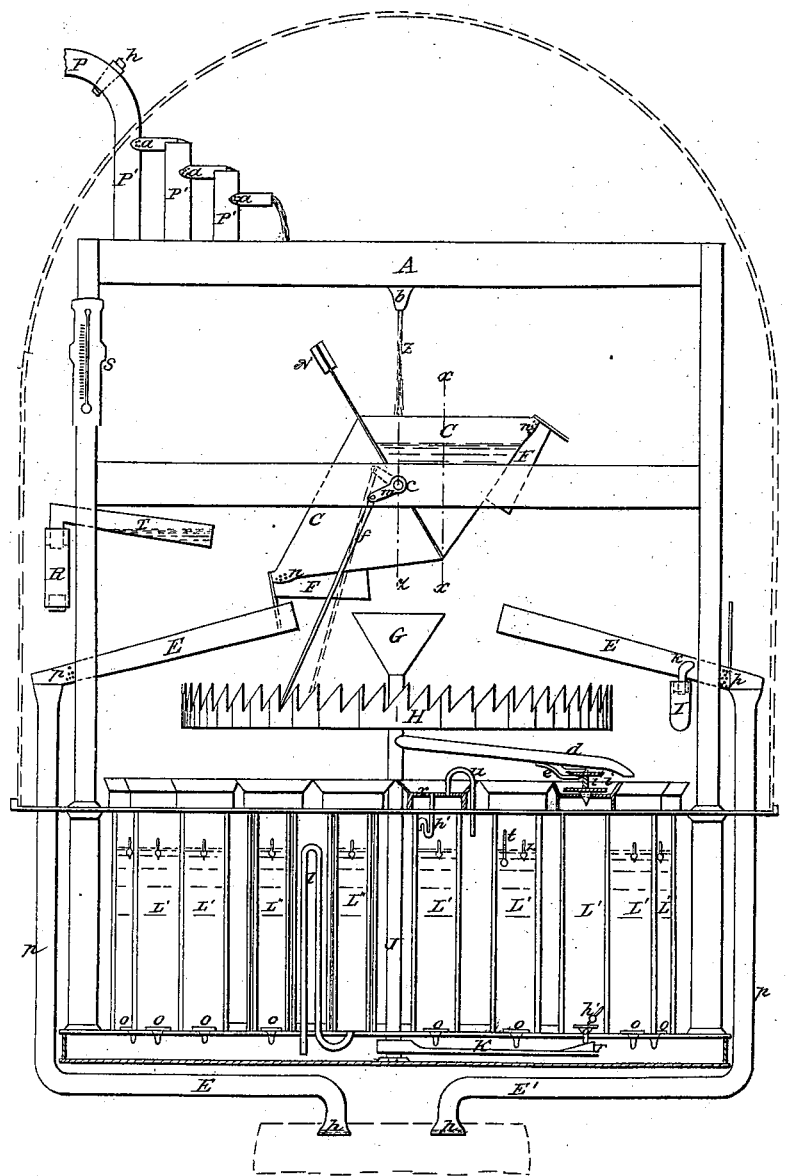
Figure 1 is a side elevation of a meter with most of my improvements applied thereto.

In constructing my improved meter, I provide a suitable frame, in the upper portion of which I mount a tank, A, to receive the spirit as it flows from the still through a pipe, P. My first improvement consists of a series of upright tubes or cells, P', with pipes, $a$, connecting them, as represented in fig. 1, there being a series of small perforations in each of the tubes P', at the point where the pipe $a$ leads from it to the next lower one. The object of this arrangement is to prevent any substances from passing over into the meter, and choking or otherwise interfering with the operation of any of its parts. If sand or any heavy substance enters the cells P', it will settle at the bottom, and remain there, while, if any light material passes over, such as hops or similar substance, as might be the case by accident or fraudulent intent, or if the meter be used for beer, then such material will float on the top of the fluid in the cells P', and be arrested by the strainers at $a$.

From the reservoir, A, the spirit will flow through a tube or spout, $b$, into one or the other of a pair of measuring-reservoirs, C, which are united and hung on an axis, $c$, as shown in fig. 1, the two reservoirs C thus forming a tilting-hopper, or measuring or weighing-apparatus. To the extremity of the division between the reservoirs C, a weight, N, is attached, for the purpose of holding them in position, when tilted to either side, until the one that is under the spout becomes filled sufficiently to overbalance the weight N, and tilt it to the opposite side, emptying the contents into the spout E, as represented in fig. 1. To the under side of each reservoir C there is attached a spout, F, of such a length that, as the reservoir C is being emptied, the small quantity of the liquor that will flow through the perforations $a\, n$, in the extreme side of the reservoir, will flow out at the opposite end of this spout F into a funnel, G, placed directly under the tilting-reservoir, as shown in fig. 1. From this funnel G a spout, $d$, extends outward far enough to conduct the sample of liquor thus separated into one of a series of transparent sample-tubes, L', arranged in a circle around the base of the meter.

In order to move this spout $d$ around from one to another of the sample-tubes or chambers, as they become filled, I attach to the shaft, on which the funnel G is mounted, a horizontal disk or wheel, H, having a vertical rim, provided with a series of ratchet-teeth, as shown in fig. 1. To the axis, $c$, of the tilting-device, I attach a short crank, $m$, to which is connected a pawl, $f$, the lower end of which engages in the notches of the disk H, so that as the reservoirs C are tilted over to the left, as represented in fig. 1, the pawl $f$ will act upon the disk G, and by pushing it a short distance each time, will thereby move the spout $d$ around. In order to prevent the spout from being carried too far, the pawl $f$ is so arranged that it will not strike against the teeth of the disk until the reservoir C has arrived almost at a state of rest; and if necessary, the disk G may have a spring bearing against it, to prevent it from moving too readily or too far; and, further, this spring may be arranged to rest in or enter slight depressions at the instant it is desired to stop the disk. The rotation of the disk with its sample-spout, $d$, may be so arranged as to deposit a single sample in each of the sample-chambers L', or it may be so arranged or geared as to deposit any required number of samples in each chamber before passing to the next one.

In order to automatically empty these sample-chambers, either of the two following plans may be adopted, as may be found most expedient in practice: First, they may have a valve, $o$, located at their bottom, these valves opening inward, and being operated by an incline, $r$, attached, by an arm, $k$, to the shaft J, this arm being located the width of one sample-tube in advance of the spout $d$, so that, as it moves forward, the incline $r$ will strike against and open the valve $o$ in the sample-chamber next in advance of the one into which the spout $d$ is emptying. By this arrangement, all the sample-chambers may be kept filled, except the one immediately in front of the one being filled; or, instead of the valve $o$, each of the sample-chambers L' may have attached to it a siphon, $l$, as represented in fig. 1. When the sample-tube becomes filled, so as to set the siphon $l$ in operation, the tube L' will be emptied thereby, without the use of any valves, in which case the arm $k$ will be dispensed with.

In order to prevent the alteration of the samples by evaporation, I adopt either of the two following plans: First, the top of the tube L' will be closed tight by a diaphragm, $x$, from which a bent tube, $p'$, extends down into the chamber L', this tube being bent, as shown in fig. 1, so as to form a trap, and thus, while it permits the liquor to pass through it into the chamber L', it will have its lower curve filled with liquor, thereby sealing the chamber and preventing any evaporation. At the same time, in order to permit the air to escape from the chamber L', and thus let the liquor enter, I attach to the upper portion of the same a bent tube, $u$, through which the air will escape as the liquor enters, it being a well-known or demonstrated fact in philosophy that no evaporation will take place through a tube bent in this form, and located as represented; or, instead of these tubes $p'$ and $u$, the top of the sample-chamber L' may have an opening, provided with a valve, $i$, as represented in the right-hand part of fig. 1, this valve being opened by an arm, $e$, arranged to pass under an inclined or curved projection attached to the valve, and thus open it at the time the spout $d$ is emptying into that particular chamber, the valve closing again, either by its weight or by a spring, as soon as the spout $d$ passes to the next chamber, L'.

In order to prevent any tampering with the samples in the chambers L' by heat, or by evaporating its contents, and thus changing its quality or specific gravity, I construct them of glass, with double walls, as represented at L'' in fig. 1, these sample-chambers being composed of two glass tubes, placed one within the other, and separated by a space through which a current of air may pass, and thus prevent the transmission of heat to the inner tube.

In order to still further prevent any tampering with the meter or its contents by the application of heat to any portion of it, I attach to it one or more self-registering thermometers, as represented at S in fig. 1, by which means the application of any undue amount of heat will be at once detected.

To prevent the possibility of damming or closing up the delivery-spouts, E or E', and causing the liquor to overflow into other portions of the meter, from whence it may be drawn off clandestinely, or in any way interfere with the operations of the meter, I attach to the spout E, and to such other parts as may be necessary, a pipe, $k$, with its mouth so located that, before the spout E will overflow, a portion of its contents will flow through the pipe $k$, and to the lower end of this pipe $k$, I attach a glass receiver, I, to catch and retain a portion of the overflow. There may be any desired number of these tell-tales, and they will be so located that they cannot be touched or opened by the operatives. By this means, the inspector, or person having charge of the meter, can, at any time, detect any attempt at tampering by causing an overflow, as described.

To prevent any tampering by means of tipping the meter, so as to interfere with its perfect operation, I attach to it three or more tubes, T, as represented in the left-hand portion of fig. 1. These tubes T are slightly inclined towards the centre of the meter, they being located radially at different points, and their outer ends are bent so as to assume a vertical position, and terminate in a glass-reservoir, R. In the horizontal portion, T, is placed a small quantity of quicksilver or other fluid, or small balls, shot, or similar spherical bodies, which, whenever the meter is tilted, will pass out of the tube T and fall into the trap or reservoir R, where it will remain, thus affording a sure means of exposing any change in the position of the meter, the working parts of the meter being enclosed in a tight case, as represented by the red lines in fig. 1, to prevent persons from interfering with it in any manner.

Figure 3:
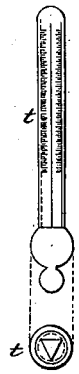
Figure 4:
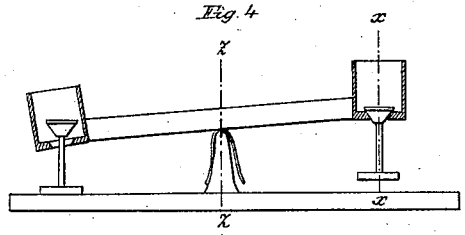

In each of the sample-chambers L', I place an hydrometer and thermometer, either combined or separate, to indicate the specific gravity and temperature of the sample, both the thermometer and hydrometer having three faces, with graduations on each face, as represented by $t$, fig. 3, so that they may be read from the outside, whatever position they may assume.

Figure 2:
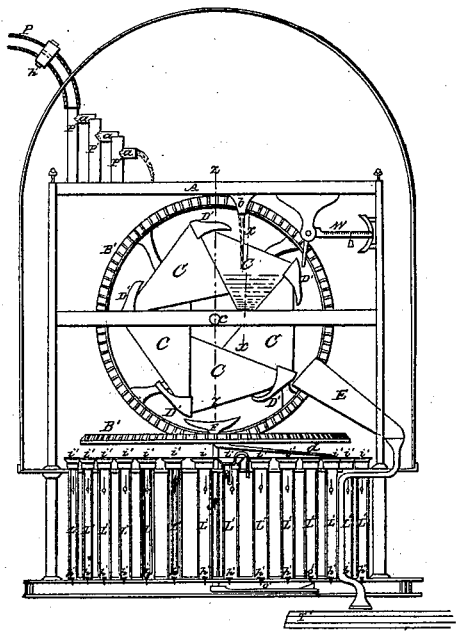
Figure 2 is a similar view of a meter constructed on the same general plan, with a different measuring-apparatus attached.
Figure 5:
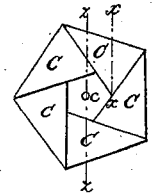

In fig. 2, I have represented a meter, constructed on the same general plan, but instead of the tilting measuring-apparatus, I have substituted a measuring-apparatus consisting of a series of cups or reservoirs, C, arranged around a central axis, equidistant, in the form of an overshot water-wheel. In this case I have represented five cups, but there may be more or less, an odd number being preferable, and care being taken to so arrange the compartments that, while in position to be filled, the centre of gravity of the fluid in the chamber being filled shall always occupy the same relative position to the axis of the wheel, whether there be much or little fluid in the compartment. A wheel of this kind is formed by prolonging in a straight line the sides of an equilateral figure, as represented in Figure 5.

When a measuring-apparatus of this style is used, there will be a sample-cup, D', attached to the outside of each compartment, in such a position that, as the compartment empties itself into the spout E, a small portion of its contents will be caught and retained in the cup D', and as the wheel rotates, to empty the next cell, this cup will be brought into such a position that the sample will be emptied out into the funnel F, from whence it will flow through a spout into the sample-tube L', as previously described. The spout in this case may be rotated by means of a bevel-gear, B', on the wheel engaging with similar gear, B', on the disk, as represented in fig. 2, or by any equivalent means.

To hold the measuring-wheel in position while the cell is being filled, I pivot a lever, W, as represented in fig. 2, so that one arm will rest against the wheel, until the compartment becomes sufficiently filled to tip the lever W, and let the wheel move, and empty the filled cell into the spout E. This lever may be graduated, and provided with a weight, like a steelyard-beam, so that it may be adjusted to measure any desired quantity.

In any event, whatever form or style of measuring-cup or cell may be adopted, I so shape and locate them that, while a cell is being filled, the centre of gravity of the fluid in the cell, whether it be more or less in bulk or in specific gravity, shall be, in relation to the axis of rotation or of oscillation, at all times the same, the object being to have the weight of fluid in the cell operate with the same leverage, whether the cell be wholly or only partially filled. To accomplish this object, two conditions must exist: First, the cell or cup, whatever form of apparatus be used, must be so shaped and placed, while being filled, that its centre of gravity will constantly preserve a uniform distance from the centre of motion. This is accomplished by making the cell or cup of such a shape that, when in position to be filled, the fluid, as it rises or accumulates in the cell, shall be in equilibrium on opposite sides of a perpendicular line passing through the centre of gravity, and which line, of course, will stand parallel to a similar line passing through the axis or centre of motion of the apparatus. This idea is clearly represented in the tilting-apparatus shown in fig. 1, in the wheel represented in fig. 2, and in the device represented in Figure 4, the line $x\,x$ indicating the centre of gravity, and the line $z\,z$ the perpendicular plane of the centre of motion. In each of these figures it will be apparent that, as the fluid accumulates in the cell, there will be an equal addition of weight on each side of the line $x\,x$, and that consequently the centre of gravity will remain uniform, and therefore the leverage the same, no matter what the quantity or specific gravity of the fluid in the cell.

Figure 6:
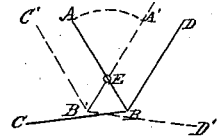

The second condition is, that the apparatus must be so arranged as to move just far enough to bring the cell to be filled into the position above described. If it tips too far, then, as the cell is filled, the leverage will be increased, as the centre of gravity will be constantly moving farther from the centre of motion, and *vice versa*. This is illustrated by the diagram, fig. 6, in which E represents the centre of motion, and the angles, A, B, C, the boundaries of one cell, exactly equal in size and form to the opposite cell, the angles of which are represented by A, B, D. The hopper, thus constructed, is arranged to vibrate through the arc of a circle, the angle of which is exactly equal to the angle at the bottom of the cell. Thus, as represented in fig. 6, the angle A E A′, the arc of which is A A′, must be equal to the angle A B C, or that of the other cell, A B D, these two last being exactly equal to each other. This arrangement will give the conditions required.

In their operation, in any way, I propose to place in them, at various points, as represented at $p$, fig. 1, perforated diaphragms or wire screens. I also propose to form the pipes with a series of curves, bends, or angles, in such a way that it will be impossible to force a wire, rod, or other article along them.

In order to prevent the possibility of forcing the spirits back through the meter, by means of a force-pump or otherwise, and permitting it to be drawn off at some other point, I also propose to place in the pipes of the meter one or more check-valves, so arranged that they will open to let the spirits pass out in the proper direction, but will close whenever it is attempted to reverse the current in the pipes.

By these various improvements, I am enabled to construct a meter that will operate in a most perfect and satisfactory manner, and that will prevent or expose any efforts at tampering, to a degree never before attained.

Having thus described my invention, what I claim, is—

1. Delivering the spirits into a series of cells, P′, provided with strainers at their outlets, substantially as described, to prevent the entrance into the meter of any foreign substances.

2. The tilting measuring-cells C, provided with the sample-spouts E, arranged to deliver the samples into the funnel G, substantially as described.

3. A series of sample-chambers or tubes, L′, arranged to receive the samples as they are delivered from the funnel G through the spout $d$, or equivalent means.

4. I claim providing a meter with the rotating spout $d$, arranged to be operated by the movements of the measuring-apparatus, so as to deliver the samples to the sample-tubes in succession, substantially as set forth.

5. I claim making the sample-tubes L′ with double glass walls, as described, for the purpose of preventing the evaporation of the samples by heat.

6. I also claim providing the sample-tubes with a valve, $i$, arranged to be opened by the movements of the arm $e$ or other part of the meter, to permit the entrance of the sample, and be closed again when the sample is in, to prevent evaporation.

7. I claim providing the sample-tubes with a valve or cock at their bottom, to be opened by the incline $r$ on the arm K, attached to and operated by the disk H, or equivalent means, to draw off the samples, as described.

8. I claim providing a spirit-meter with a series of radial tubes T, so arranged that any material movement of the meter will cause the contents of said tubes to flow out into and be retained in the vertical cups R, substantially as and for the purpose set forth.

9. I claim the use of a measuring-wheel, composed of a series of cells or compartments, C, arranged as represented in fig. 2, and herein described.

10. I claim constructing and arranging the measuring-cups or cells of meters, as herein described, so that the leverage shall be uniform, whatever the quantity or specific gravity of the fluid being measured.

11. I claim making the pipes leading to or from the meter double, or encasing them within a second tube, to prevent tapping them or artificially cooling or heating them, or abstracting liquor therefrom by capillary holes, substantially as described.

J. G. ALLEN.

Witnesses:
W. C. DODGE,
P. T. DODGE.